Jan. 8, 1952 T. J. GLAZA 2,581,853
CONDUIT INDEXING AND COUPLING DEVICE
Filed March 24, 1950 2 SHEETS—SHEET 1
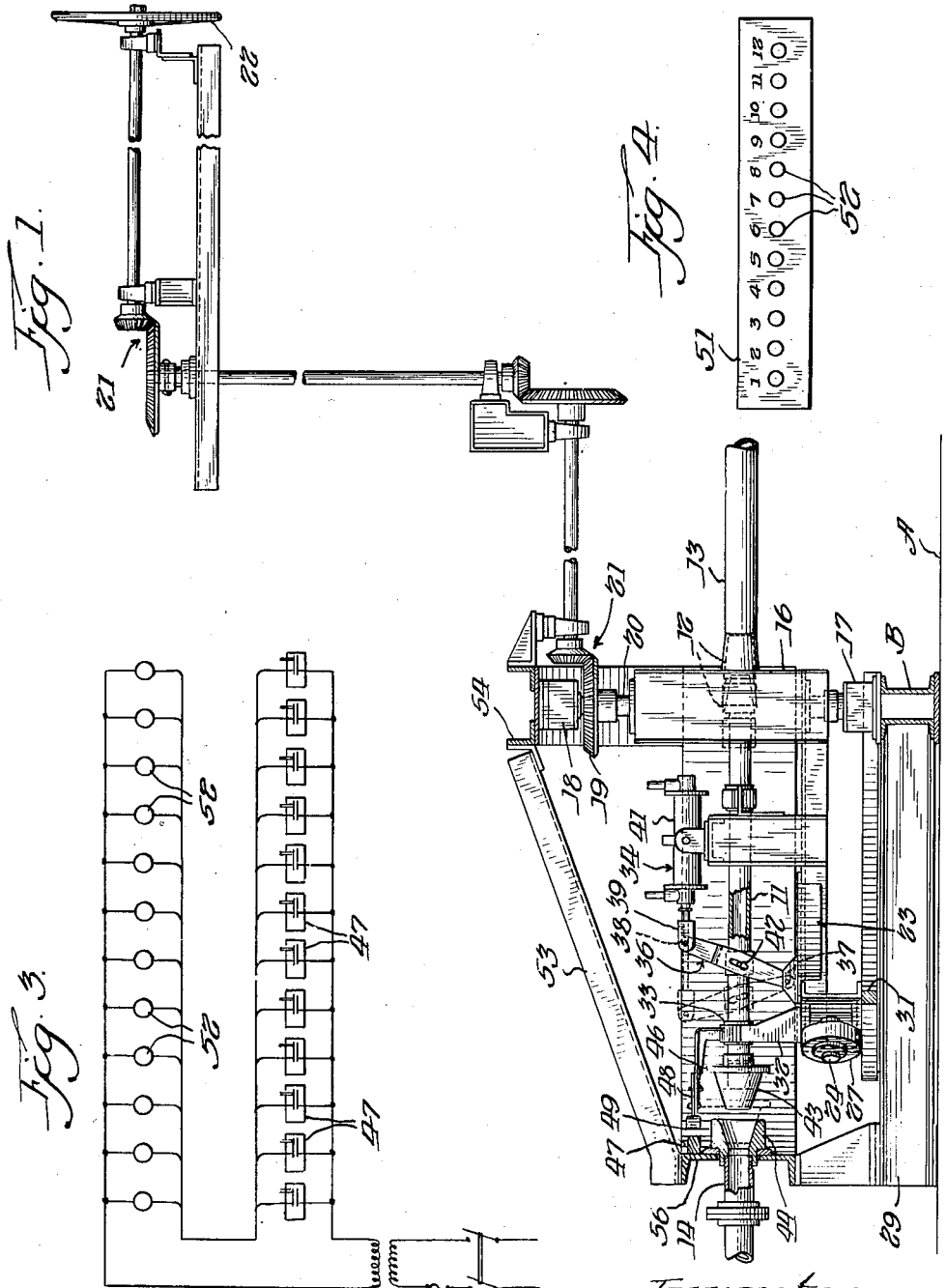
Inventor.
Thaddeus J. Glaza.
By Joseph O. ...
Atty.

Jan. 8, 1952 T. J. GLAZA 2,581,853
CONDUIT INDEXING AND COUPLING DEVICE
Filed March 24, 1950 2 SHEETS—SHEET 2
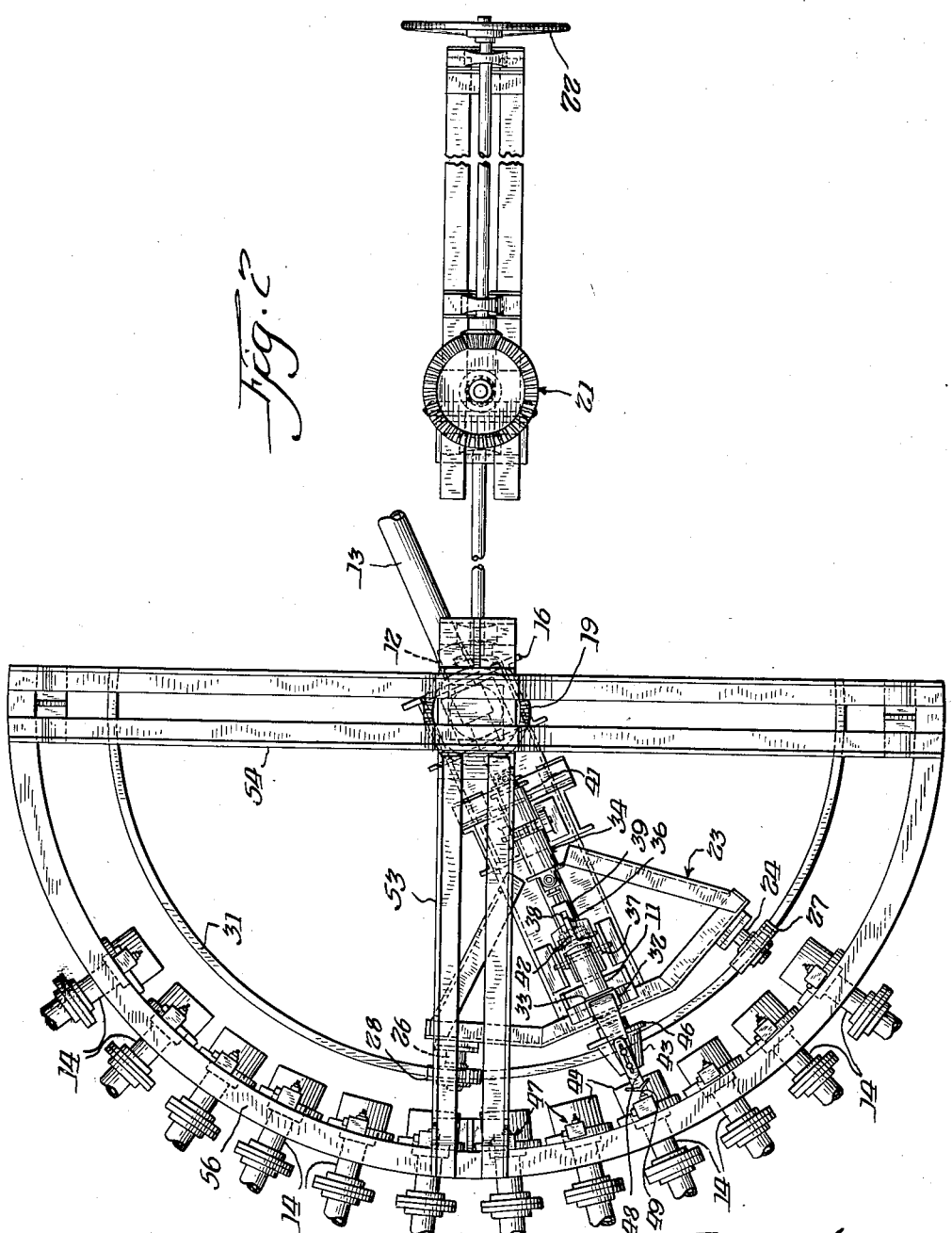
Inventor.
Thaddeus J. Glaza.
By Joseph O. Lang
Atty.

Patented Jan. 8, 1952

2,581,853

UNITED STATES PATENT OFFICE 2,581,853

CONDUIT INDEXING AND COUPLING DEVICE

Thaddeus J. Glaza, Chicago, Ill., assignor to Crane Co., Chicago, Ill., a corporation of Illinois Application March 24, 1950, Serial No. 151,767

2 Claims. (Cl. 302—28)

This invention pertains generally to foundry equipment wherein a conduit indexing and coupling device or arrangement is employed for the distribution of granular and liquid materials, such as sand, cement, coal, grain, flour, and water, milk, syrup, and beverages. More specifically, the invention relates to an indexing mechanism for a sand blower or the like.

At the outset, in order to obtain a better appreciation of the significance of this contribution, it should be understood that the apparatus may be used, for example, in connection with a conduit type of supply line for transporting therethrough fungible goods, liquids, or the like. Such source of supply may be of the type of pneumatic conveyor disclosed in U. S. patent application, Serial No. 125,712, filed November 5, 1949, of which this applicant is the inventor.

An important object of this invention is to provide a structure which will serve as an enclosed adjustable feed passageway or connection between a pressurized supply line and a delivery or take-off line, for transporting certain goods of the character above referred to. Preferably, such a structure provides for selectively indexing the apparatus to one of a plurality of delivery lines, thereby requiring only a single feed line for selective communication with a plurality of delivery lines leading therefrom. This arrangement has been found to expedite the conveyance of materials and avoids the previous cumbersome systems of hand transporting, expensive and involved pipe lines, connections, controls, and the like.

Another object of the invention is to provide for the transportation of goods, such as sand, with a novel apparatus whereby manpower is conserved, because actually in most instances, only one man is needed to effect the operation of this device to conveniently and quickly distribute materials to various points. Since the combined system, when connected, is completely closed during operation, the objection of spilled goods with attendant losses is lessened, requiring only a few, if any, men for clean-up. Also, the usual dust and other waste of such goods, normally associated with their transportation, are reduced to a minimum.

Another object is to avoid transportation congestion in the movement of such goods in the plant, foundry, or other restricted space, since the structure of this invention requires only a relatively small indexing mechanism with the remainder of the system consisting of the usual delivery pipe lines leading to the desired destinations. In the event of some changes in the points of destination for the goods, these delivery pipe lines may be easily adjusted to compensate for such changes without interfering with the delivery to any other points. Therefore, the resultant system is very flexible in its allowance for subsequent changes of destination or conveyance of goods, and providing also that in the event of failure of some one or several delivery lines, the remaining lines of the system are not adversely affected.

Still another object is to provide a comparatively simple and flexible system for conveying materials, employing pipe lines as the only conveyor means and avoiding a complicated valve system and duplication of pipe lines, each delivery line being independently operable in the system. In the present structure, there are no moving parts except the indexing mechanism which need not be located near workers other than the one operator.

Other objects and advantages will become more readily apparent upon reading the following description with reference to the accompanying drawings, in which Fig. 1 is a partial section elevation view of a preferred embodiment of the indexing mechanism.

Fig. 2 is a top plan view of the mechanism referred to in Fig. 1.

Fig. 3 is a wiring diagram of the indicating light and switch mechanisms.

Fig. 4 is a view of the indicating light panel.

Similar reference numerals refer to similar parts throughout the several views.

In the view shown in Fig. 1, the indexing mechanism comprises a preferably horizontal straight length of pipe 11 which is coupled at one end 12 to a flexible blower supply line 13, while the other end is free or disconnected, as indicated. The pipe 11 is predeterminedly pivotably movable and is supported upon suitable structure, for selectively indexing the pipe 11 for fluid-tight connection with a plurality of stationary take-off pipes 14, in a manner hereinafter described in greater detail in connection with Fig. 2. Thus, it will be apparent that by making a connection with one of the take-off pipes 14, a continuous dispatch system will be selectively effected, thereby providing a pneumatic conveyor from the supply source to the take-off pipe termination (not shown).

In general, it should be understood that the rotation of the apparatus centers about a rotatable vertical post or support member 16, the framework of which preferably surrounds the coupled section 12 of the straight length of pipe 11 and the supply pipe 13, as more clearly shown in Fig. 1. The degree of rotation may be the maximum, as that of a complete circle, if the number and location of the take-off pipes 14 require such provision. A thrust bearing 17 and a radial bearing 18 support the lower and upper ends, respectively, of the vertical support to provide the means for rotating the support 16 about its vertical center line. Preferably, a beam B, supported on the floor A, is positioned below the lower bearing 17 to support the vertical frame 16. A bevel gear 19, keyed to a shaft 20, which is connected to the vertical support 16 below the upper bearing 18, transmits the rotating force to the vertical support 16. Rotation of the conduit connecting apparatus may be accomplished through a series of bevel gears and shafts 21 operated by a handwheel 22 which may be located on the level of an upper floor, as indicated in Fig. 1.

Both the bearings 17 and 18 and the bevel gear series 21 obviously may be replaced by a journal bearing and a sprocket and chain, respectively, or any other suitable means for carrying out the normal actuating functions of these devices. It should also be clear that these mechanical means for rotating the apparatus may be replaced by the operator manually pivoting the pipe 11, if so desired.

The free or disconnected end of the pivotal pipe 11 is shown as supported by a carriage 23 which extends from the base of the vertical support 16 and is rotatably connected relative to the latter member. The outer end of the carriage 23 holds two shafts 24 and 26 on which the wheels 27 and 28 are mounted, as shown in Fig. 2. Below the carriage 23 is a base frame structure 29 which includes a curved rail 31 providing a track for the carriage wheels 27 and 28. It should, of course, be understood that both the wheels 27 and 28 and the rail 31 could easily be replaced by a sliding member, which would move over any suitable surface without departing from this invention. The carriage 23 is provided with an upward extending end supporting member 32 having a bushing 33 for receiving the pivotal pipe 11, to secure the same and allowing it to be axially slidable therein.

An actuating mechanism 34, for providing axial movement of the pipe 11, is mounted on the carriage 23 with a substantially vertical lever 36 pinned at the lower end 37 to the carriage 23. The upper end 38 of the lever 36 extending above the pivotal pipe 11 is securely pinned to a piston rod clevis 39 which is preferably reciprocated by a conventional two-way air cylinder 41. A center point 42 of the lever 36 is slidably pinned to the pivotal pipe 11 in a manner to permit the pipe 11 to be axially movable upon actuation of the upper end 38 of the lever 36. Obviously, the actuating mechanism 34 may, if desired, consist of a hand operated lever (not shown), thereby eliminating the need for the air cylinder 41 as the source of power.

As a substantial and significant part of this invention, a plurality of stationary delivery or take-off lines 14 are radially located around the arc of travel described by the pivotal pipe 11, as shown in Fig. 2. These delivery pipes 14 are arranged to register separately with the pivotal pipe 11 which is moved axially by the operation of the actuating mechanism 34, to couple with a selected one of the delivery pipes 14, preferably in fluid tight relation. The mating sections of these pipes may be any suitable type of joint, such as the end portions shown in Fig. 1, which are of frusto-conical shape, with the pivotal pipe end 43 entering the take-off pipe end 44, to form a tight fit therebetween, as shown in the dotted lines. The frusto-conical or tapered surfaces of the ends 43 and 44 provide for readily joining the said pipes, and a collar 46 on the rotatable pipe 11 acts as a coupling stop. Of course, the detailed manner in which the latter joints are made may vary substantially, depending upon the type of material being handled and the pressures involved.

Indicator means, such as the electrically operated micro-switches 47, are preferably employed between the pivotal pipe 11 and the take-off pipes 14. These devices will transmit a signal to an operator, who may be stationed at a location remote to the said pipes, advising him that the pivotal pipe 11 is at such time aligned with a particular take-off pipe of the pipes 14.

The micro-switches 47 may consist of an adjustable brush contact arm 48 mounted on the free end of the pivotal pipe 11. Contact points 49, located with each of the take-off pipes 14, will close the electrical circuit with the contact arm 48, in the manner as shown by the circuit wiring diagram of Fig. 3. Connected within this circuit, a signal panel 51, having a plurality of lamps 52 corresponding to the take-off pipes 14 (see Fig. 4), may be located near the position of the operator. Thus, each of the lamps 52 on the panel 51 will indicate to the operator that the pivotal pipe 11 is aligned with a particular pipe of the take-off pipes 14. The pipe actuator 34 is then operated to connect the said pipes to form the above described joint.

When the above described pipe connection has been made, the blower supply is turned on by a conventional means, thereby to convey material, such as sand, respectively through the supply line 13, the pivotable pipe 11, and one of the delivery pipes 14, to the point of desired destination. Operation of the actuating mechanism 34 will withdraw the pivotal pipe 11 from one of the delivery pipes 14, leaving the pivotal pipe 11 free to be selectively rotated or indexed to any other one of the delivery pipes 14, as more clearly shown in Fig. 2.

A supporting brace member 53 may be connected between an upper frame 54 of the vertical support 16 and a frame 56 of the delivery pipes 14 to insure greater stability and alignment of the mechanism.

It will be apparent that a relatively simple and efficient means has been provided to quickly and conveniently dispatch and convey sand or the like through a system of conduits; and it will also be understood that the invention is not limited to the precise embodiments as hereinbefore described, but it is susceptible to changes without departing from the spirit thereof or the scope of the appended claims.

I claim:

1. A conduit indexing mechanism for a combined blower conveyor for sand or the like comprising in combination a rigid connecting pipe having one end attached to said blower and the other end free to be moved, pivotal support means at the blower end of the said connecting pipe, a plurality of delivery pipes mounted radially with respect to the said pivotal support and having ends formed to join in substantially fluid sealing relation with the said connecting pipe, actuating means for pivotally positioning the said connecting pipe to align selectively with one of the said delivery pipes, and means for axially moving the said connecting pipe to mate with and separate from the selected one of the said delivery pipes, the said latter means comprising a carriage having a vertical lever pivotally movable at a lower end thereof relative to the said carriage, a piston rod clevis cooperating with the said carriage, a fluid cylinder for actuating the said clevis, the upper end of said lever being connected to the said clevis, a central portion of the said lever being slidably pinned to the said connecting pipe to allow said latter pipe to be axially moved upon actuation of the upper end portion of the said lever.

2. A combined blower conveyor and indexing mechanism comprising in combination a connecting pipe having a tapered end portion free to rotate, a vertical support receiving the said connecting pipe and having rotating means therewith, a plurality of delivery pipes rigidly mounted substantially in the arcuate path of rotation of the said connecting pipe, each of said delivery pipes having connecting means with a mating end tapered portion adjoining the path of rotation of the connecting pipe, means attached to said connecting pipe for axially moving the said latter member to join with and separate from a desired pipe of the said delivery pipes upon predetermined actuation of the means attached to the said connecting pipe, supporting means therefor, a vertical lever pivotally movable from a central position thereof relative to the said connecting pipe, the said lever having pivotal connections at upper and lower end limits thereof, an actuating fluid cylinder for the said lever, the upper end limit of the said lever being connected to the said cylinder, the lower end limit being pivotally connected to the said supporting means, the latter supporting means including a carriage with rollers and a base frame structure with a curved rail for the arcuate movement of the said carriage rollers.

THADDEUS J. GLAZA.

REFERENCES CITED

The following references are of record in the file of this patent:

UNITED STATES PATENTS

| Number | Name | Date |
| --- | --- | --- |
| 721,743 | Richmond | Mar. 3, 1903 |
| 907,848 | Morehouse | Dec. 29, 1908 |
| 1,741,041 | Taylor | Dec. 24, 1929 |
| 1,831,196 | Read | Nov. 10, 1931 |
| 1,857,643 | Kinyon | May 10, 1932 |
| 2,434,435 | Reibel | Jan. 13, 1948 |